United States Patent
Trowbridge et al.

(10) Patent No.: US 11,304,370 B2
(45) Date of Patent: Apr. 19, 2022

(54) REVERSIBLE COMPRESSION AUGER ON HARVESTING HEADER

(71) Applicant: CNH Industrial America LLC, New Holland, PA (US)

(72) Inventors: Jeffrey C. Trowbridge, Stevens, PA (US); Cory Douglas Hunt, Millersville, PA (US)

(73) Assignee: CNH Industrial America LLC, New Holland, PA (US)

(*) Notice: Subject to any disclaimer, the term of this patent is extended or adjusted under 35 U.S.C. 154(b) by 209 days.

(21) Appl. No.: 16/662,524

(22) Filed: Oct. 24, 2019

(65) Prior Publication Data
US 2021/0120743 A1 Apr. 29, 2021

(51) Int. Cl.
*A01D 75/18* (2006.01)
*A01D 41/14* (2006.01)
*A01D 61/00* (2006.01)

(52) U.S. Cl.
CPC ......... *A01D 75/187* (2013.01); *A01D 41/142* (2013.01); *A01D 61/002* (2013.01); *A01D 61/004* (2013.01)

(58) Field of Classification Search
CPC ...... A01D 75/187; A01D 41/14; A01D 57/20; A01D 69/00–69/12; A01D 41/142; A01D 61/004; A01D 61/002; B65G 33/26; B65G 33/08; B65G 65/46; B65G 2811/097; B65G 2812/0505
See application file for complete search history.

(56) References Cited

U.S. PATENT DOCUMENTS

| 4,218,864 A | 8/1980 | Allemeersch et al. |
| 4,663,919 A | 5/1987 | Stroh et al. |
| 4,793,561 A * | 12/1988 | Burda ............ B02C 18/24 241/101.2 |
| 5,191,753 A * | 3/1993 | Fachini ............ A01D 46/08 56/10.9 |

(Continued)

FOREIGN PATENT DOCUMENTS

| DE | 3341071 A1 | 5/1984 |
| DE | 3708550 A1 | 9/1987 |

(Continued)

OTHER PUBLICATIONS

Extended European Search Report for EP Application No. 20203571.3 dated Mar. 1, 2021 (seven pages).

*Primary Examiner* — Alicia Torres
*Assistant Examiner* — Madeline I Runco
(74) *Attorney, Agent, or Firm* — Peter Zacharias; Patrick Sheldrake

(57) ABSTRACT

A system and method for reversing a rotational direction of an auger of a header. The system includes a fluid line for delivering fluid to a motor that drives the auger. A directional flow control valve is connected to the fluid line and is movable between a first state in which the valve is configured to deliver the fluid to the motor in a first fluid direction to cause the motor to move the auger in a first rotational direction, and a second state in which the valve is configured to deliver the fluid to the motor in a second fluid direction that is different from the first fluid direction to cause the motor to move the auger in a second rotational direction that is opposite to the first rotational direction.

16 Claims, 7 Drawing Sheets

(56) References Cited

U.S. PATENT DOCUMENTS

| | | | |
|---|---|---|---|
| 5,527,218 A * | 6/1996 | Van den Bossche | A01D 41/142 460/116 |
| 5,778,644 A | 7/1998 | Keller et al. | |
| 6,651,412 B1 | 11/2003 | Sierk et al. | |
| 7,040,980 B1 * | 5/2006 | Kestel | A01D 41/1217 414/345 |
| 8,186,136 B2 | 5/2012 | Eick et al. | |
| 9,144,197 B2 | 9/2015 | Gahres | |
| 9,894,834 B2 | 2/2018 | van Vooren et al. | |
| 10,028,437 B2 | 7/2018 | Bomleny et al. | |
| 10,271,478 B2 * | 4/2019 | Trowbridge | A01D 69/005 |
| 10,462,971 B2 * | 11/2019 | Wallestad | A01D 46/14 |
| 10,791,670 B2 * | 10/2020 | Gonzalez-Mohino | A01D 69/025 |
| 2014/0096497 A1 | 4/2014 | Bollin et al. | |
| 2016/0360699 A1 | 12/2016 | Allochis | |

FOREIGN PATENT DOCUMENTS

| | | | |
|---|---|---|---|
| EP | 1046334 A1 | 10/2000 | |
| EP | 3066911 A1 | 9/2016 | |

\* cited by examiner

REVERSIBLE COMPRESSION AUGER ON HARVESTING HEADER

FIELD OF THE INVENTION

The present invention relates generally to a header of an agricultural machine, such as a combine, and more particularly, to a system and method for reversing an auger of the header.

BACKGROUND OF THE INVENTION

As is described in U.S. Pat. No. 9,144,197 to CNH America LLC, which is incorporated by reference herein in its entirety and for all purposes, a typical header of an agricultural combine includes one or more cutters, e.g., cutter bars with reciprocating knives, which cut the crop material that is harvested from the field. Once the crop material is cut, a conveyor system, which is positioned rearwardly of the cutter(s), transports the crop material to the feeder housing. Modern headers generally have cutters and attachments which are specifically optimized to harvest a particular kind of crop material. For instance, the header may include a rotating reel with tines or the like to sweep the crop material towards the cutter(s). Alternatively, the header may include snouts and row units instead of a rotating reel and cutter bar(s).

A draper header is typically used to harvest fluffy or bushy crop material such as soy beans or canola. A draper header generally includes a conveyor that is in the form of one or more flat belts, known as draper belts, to convey the crop material to the feeder housing. Typically, a draper header may include two lateral draper belts that convey the crop material longitudinally inward and a center feed belt that conveys the crop material into the feeder housing. Each draper belt may be wrapped around rollers, for example various combinations of drive rollers and idler rollers. The draper belts may include cleats extending transversely across the full width of the header, which contact the crop material to help facilitate its transportation into the feeder housing.

The draper header may also have a compression auger that is used to assist in crop transport along the width of the header and in the direction of belt travel. Such an auger may be referred to in the art as a cross auger or pea auger. It has been found that during a harvesting operation, crop can become wrapped around the auger and it can be time consuming to remove the tangled crop from the auger 131. It has also been found that momentarily reversing the direction of the auger acts to dislodge the tangled crop material.

Thus, it would be advantageous to provide a convenient and automated system for an operator of a combine to momentarily reverse the direction of the auger without necessitating the operator to leave the cab of the combine.

SUMMARY OF THE INVENTION

According to one aspect of the invention, a system for reversing a rotational direction of an auger of a header of an agricultural machine is provided. The system comprises a fluid line for delivering fluid to a motor that is configured to drive the auger. A directional flow control valve is connected to the fluid line and movable between a first state in which the directional flow control valve is configured to deliver the fluid to the motor in a first fluid direction to cause the motor to move the auger in a first rotational direction, and a second state in which the directional flow control valve is configured to deliver the fluid to the motor in a second fluid direction that is different from the first fluid direction to cause the motor to move the auger in a second rotational direction that is opposite to the first rotational direction. The directional flow control valve is maintained in the first state during a harvesting operation, and the second state during an operation to dislodge crop material that is wrapped about the auger.

According to another aspect of the invention, a method of reversing a rotational direction of an auger of a header of an agricultural machine is provided. The method includes delivering fluid through a fluid line to a motor in a first fluid direction such that the motor drives the auger in a first rotational direction during a harvesting operation, while a directional flow control valve connected to the fluid line is maintained in a first state; and switching the directional flow control valve to a second state to deliver the fluid to the motor in a second fluid direction that is different from the first fluid direction thereby causing the motor to move the auger in a second rotational direction that is opposite to the first rotational direction for dislodging crop material that is wrapped about the auger.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Figure 1:
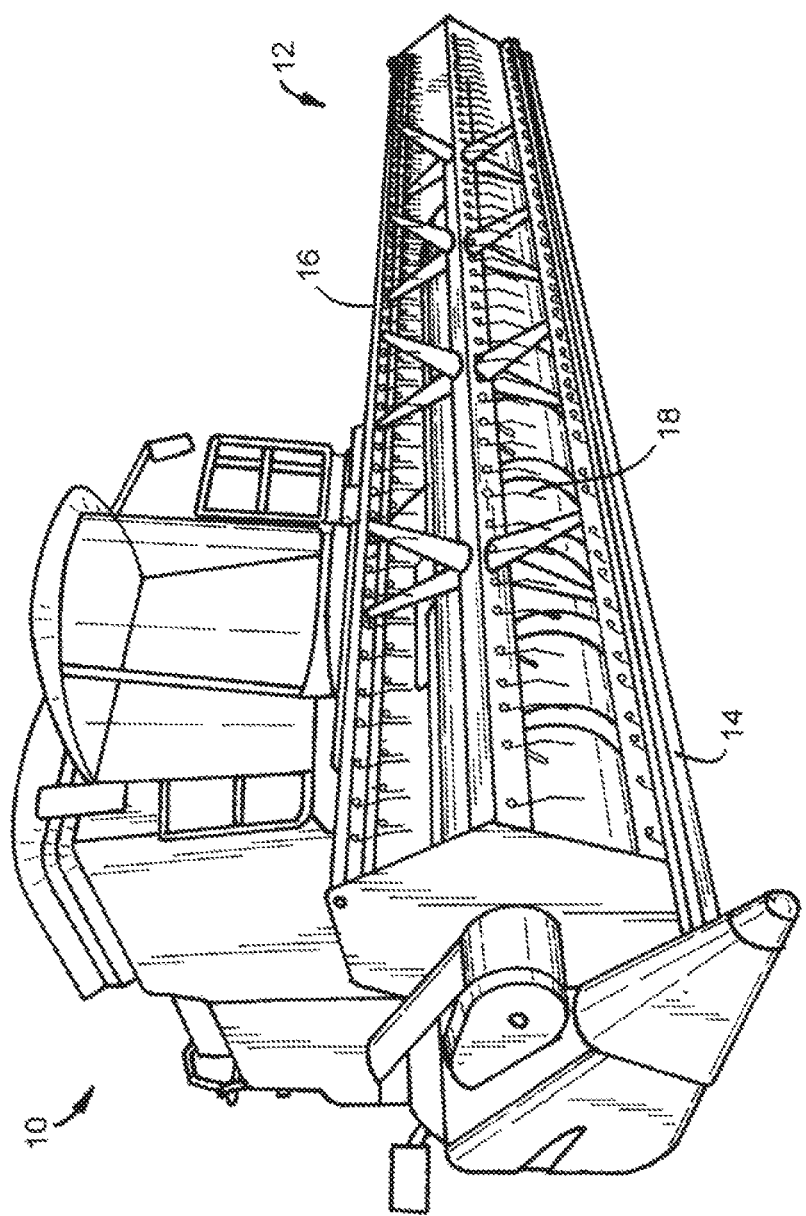
FIG. 1 is a perspective view of an agricultural harvester including a header.

Corresponding reference characters indicate corresponding parts throughout the several views. The exemplification set out herein illustrates an embodiment of the invention, in one form, and such exemplification is not to be construed as limiting the scope of the invention in any manner.

The terms "forward", "rearward", "left" and "right", when used in connection with the agricultural combine and/or components thereof are usually determined with reference to the direction of forward operative travel of the combine, but again, they should not be construed as limiting. The terms "longitudinal" and "transverse" are determined with reference to the fore-and-aft direction of the combine and are equally not to be construed as limiting.

Referring now to the drawings, as is described in U.S. Pat. No. 9,144,197, FIG. 1 illustrates an agricultural harvester applicable to the subject application in the form of a combine harvester 10 to which is attached a draper header 12. The draper header 12 has a crop cutter or knife assembly 14 arranged close the ground. The knife assembly can include a stationary blade and a reciprocating blade which together act as shears that cut the crop near the ground. A harvesting reel 16 having tines 18 rotates about a horizontal axis adjacent to the knife assembly 14 to gather the cut crop and feed it into unillustrated processing machinery of the harvester.

Figure 2:
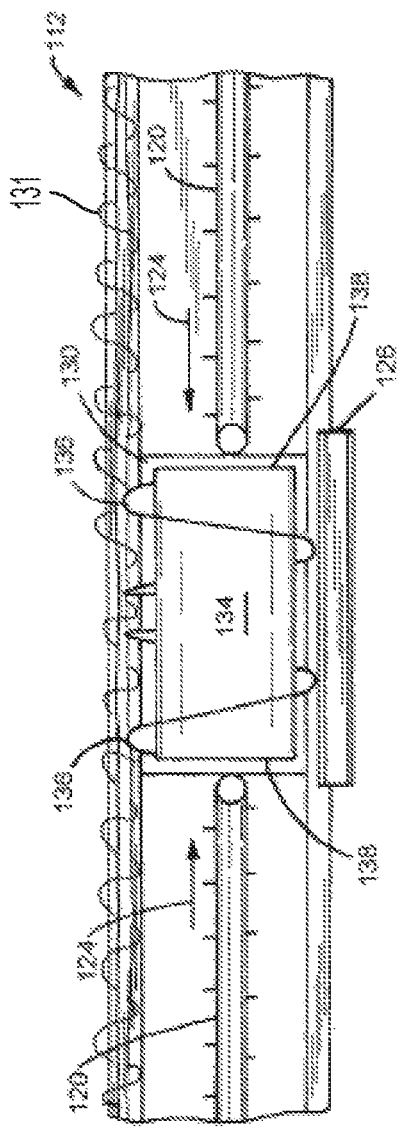
FIG. 2 is a partial schematic front elevation view of a header for an agricultural harvester.
Figure 3:
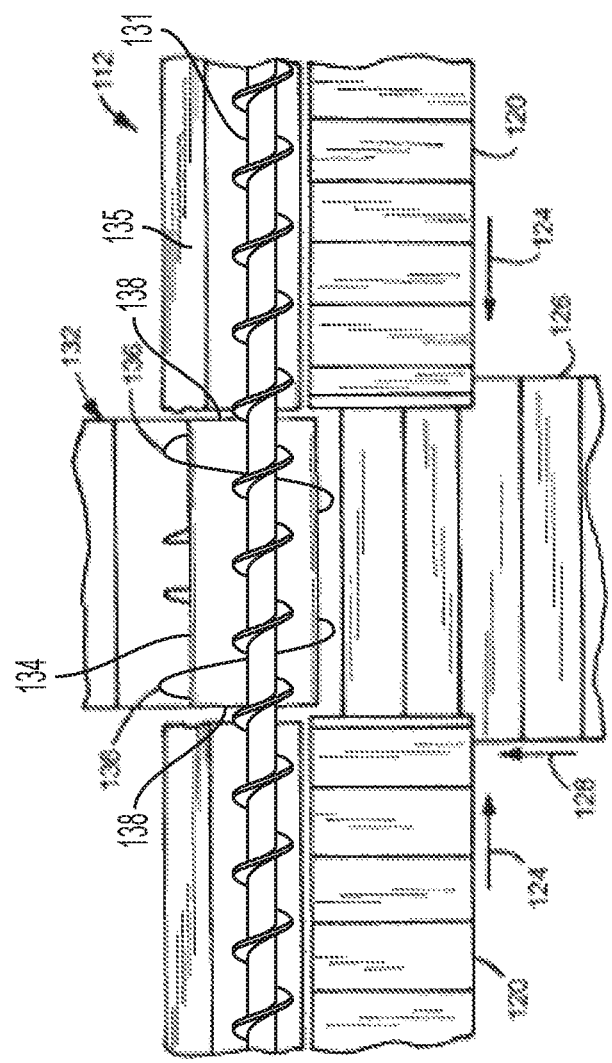
FIG. 3 is a partial schematic top plan view of the header of FIG. 2.
Figure 4:
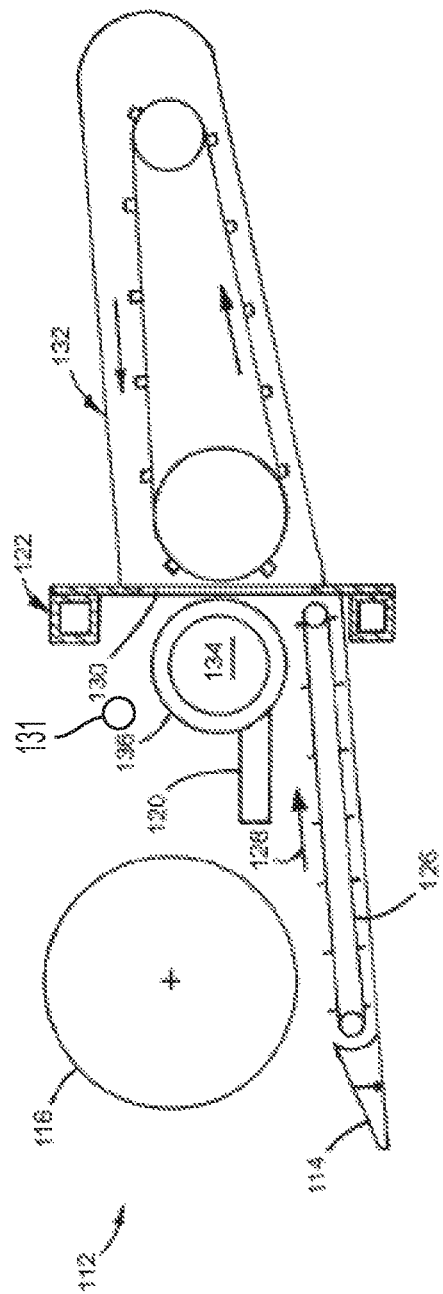
FIG. 4 is a schematic elevational cross-section view taken along a centerline of the header.

Turning to FIGS. 2 through 4, there are shown several views of another draper header 112. The header 112 includes a crop cutter and harvesting reel 116 (FIG. 4) followed rearwardly by a crop or grain conveyor system. The harvesting reel 116 gathers the crop cut by the crop cutter 114 and delivers the cut crop to a conveyor system. The conveyor system typically includes a header conveyor constructed as a pair of opposed, laterally extending conveyors 120 which extend from the lateral ends of the header frame or chassis 122 (shown in cross-section in FIG. 4) toward a generally central region of the chassis. As indicated by arrows 124 of FIGS. 2 and 3, cut crop is delivered by conveyors 120 toward a centrally located infeed conveyor 126. Infeed conveyor 126 extends substantially perpendicular to conveyors 120 and is driven by conventional belt drive means (not illustrated) to move crop in the direction of arrows 128 toward an outlet 130 (FIGS. 2 and 4) which leads to a feederhouse 132.

As seen in FIGS. 2 through 4, before reaching outlet 130, the cut crop first encounters a centrally located rotatable infeed auger 134 which impels the crop or grain through the outlet 130. More specifically, the cut crop is engaged by the helical vanes or flights 136 of the infeed auger 134 and is pushed thereby through outlet 130.

A compression auger 131 having helical veins is used to assist in crop transport along the width of the header and in the direction of belt travel. The auger 131 prevents bulky crops from migrating over the back wall 135 of the header and assists to transport the crop toward the center of the header.

It has been observed that conventional augers suffer certain disadvantages. As noted above, it has been found that during a harvesting operation, crop can become wrapped around the auger 131 and it can be time consuming to remove the tangled crop from the auger 131. It has also been found that momentarily reversing the direction of the auger 131 acts to dislodge the tangled crop material.

Figure 5:
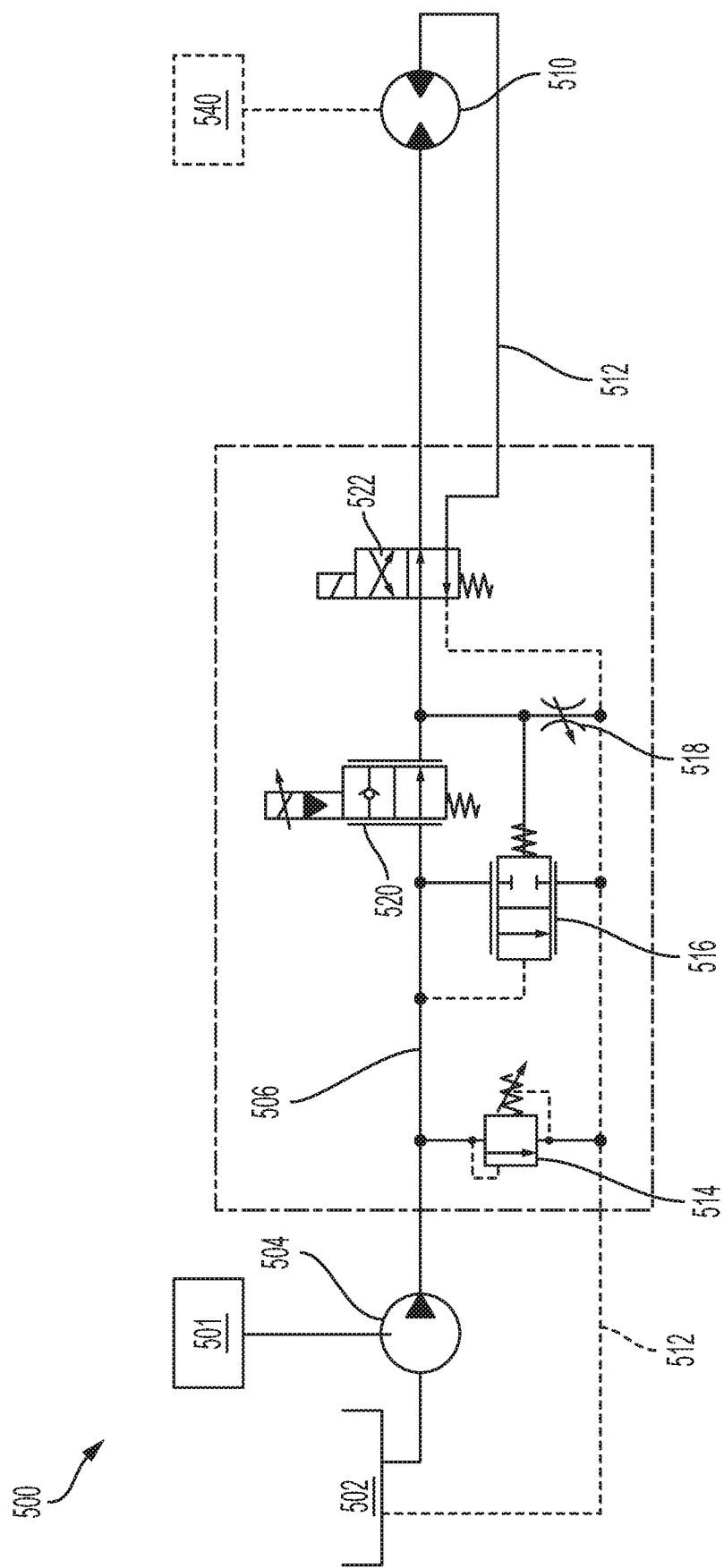
FIG. 5 is a hydraulic schematic of a system for reversing the direction of the auger of the header of FIG. 2.

FIG. 5 is a hydraulic schematic of a system 500 for reversing the rotational direction of the auger 131. The system 500 comprises a reservoir 502 for containing hydraulic fluid (or other fluid). A gear pump 504, which is controlled by a controller 501, is provided for drawing fluid from the reservoir 502 and directing the fluid through a forward path fluid line 506 toward the auger motor 510. The motor 510 is configured to rotate the auger 131 about its axis. A return path fluid line 512 is connected to a fluid port of the motor 510 for returning fluid to the reservoir 502. A relief valve 514 is fluidly connected between the fluid lines 506 and 512 for relieving excess pressure in the forward path fluid line 506. The fluid lines 506 and 512 may also be referred to herein as fluid conduits. A pressure compensated fluid valve 516 is also fluidly connected between the fluid lines 506 and 512. A manual bypass 518 permits an operator to deactivate the auger 131 for service or repair of the header.

It is noted that the system 500 is shown in a harvesting mode in FIG. 5, wherein fluid is freely delivered by the pump 504 to motor 510, such that the motor 510 rotates the auger 131 to deliver crop material to infeed conveyor 126.

A proportional flow control valve 520 is fluidly connected to the fluid line 506 at a location downstream of the pump 504. The valve 520 is movable between two states. In the open state shown in FIG. 5, the valve 520 permits the passage of fluid through the line 506 and toward the motor 510. In the open state of the valve 520, the orifice size of the valve 520 of FIG. 5 may be adjusted to control the flow rate of the fluid through the valve 520. Specifically, the duty cycle of the valve 520 is adjustable by the controller 501 to change the pressure and/or flow rate of the fluid delivered downstream of the valve 520 (i.e., in the direction of the motor 510). Thus, the setting of the valve 520 dictates the flow rate of the fluid to the motor 510. In the closed state (not shown in FIG. 5), the valve 520 operates as a check valve to prevent the passage of fluid in the downstream direction from the pump 504 to the motor 510. Together, the valves 520 and 516 are configured to provide constant flow to the motor 510 regardless of pressure fluctuations in the system 500.

A directional flow control valve 522 is fluidly connected to both fluid lines 506 and 512. The valve 522 is connected to the fluid line 506 at a location downstream of the valve 520. The valve 522 is configured to drive the motor 510 in either a forward rotational direction or a reverse rotational direction. More particularly, the valve 522 is movable between two states by the controller 501. In the normal state shown in FIG. 5, which corresponds to the harvesting mode of the combine, the valve 522 permits the passage of fluid from the valve 520 and toward the motor 510, and also permits the passage of fluid from the motor 510 back to the reservoir 502. In the reverse state (not shown in FIG. 5, but is denoted by the crossing arrows in the valve 522), the valve 522 directs the fluid from the valve 520 to the motor 510, and the valve 522 also directs the fluid from the motor 510 back to the reservoir 502. The motor 510 is normally driven in a forward direction during a harvesting operation. Driving the motor 510 in the reverse rotational direction causes the auger 131 to rotate in the opposite direction for dislodging the accumulated crop material wrapped about the auger 131.

It is noted that the valves 520 and 522 are biased by springs to a normally-open position, as shown in FIG. 5. The valves 520 and 522 may also be controlled by the controller 501. Thus, in the event of an electrical failure of the system 500, the combine may continue to be used in a harvesting mode.

Figure 6:
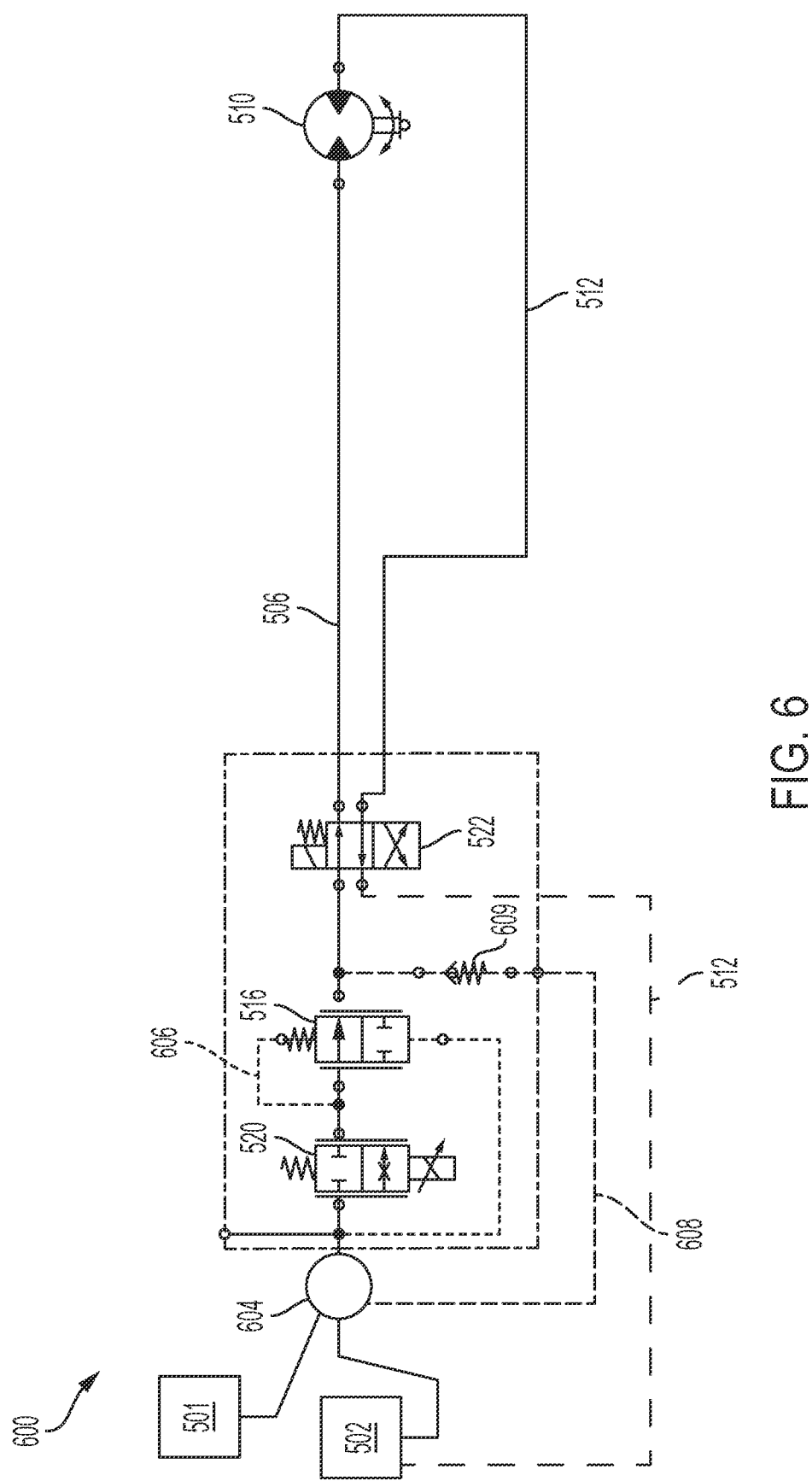
FIG. 6 is a hydraulic schematic of another system for reversing the direction of the auger of the header of FIG. 2.

FIG. 6 depicts a hydraulic schematic of another system 600 for reversing the rotational direction of the auger 131 of the header of FIG. 2. The system 600 is substantially similar to the system 500 and the primary differences therebetween will be described hereinafter.

Unlike the gear pump 504, the pump 604 of the system 600 is a piston pump. The manual bypass 518 and the relief valve 514 are omitted from system 600 due at least in part to the different pump styles. The valve 520 is normally closed, and opens upon activation of the system 600. A conduit 606 connects the downstream side of valve 520 with the input of the valve 516, Thus, the pressure at the downstream side of valve 520 is communicated to the valve 516 thereby at least partially dictating the open/closed position of the valve 516. The valves 520 and 516 together are configured to provide constant flow to the motor 510 regardless of pressure fluctuations in the system 500, as noted above. The conduit 608, which includes a check valve 609, connects the forward fluid path line 506 with the pump 604, and the pressure communicated to the pump 604 via conduit 608 dictates the position of the swash plate inside of the pump 604, which affects the flow rate of the pump.

Figure 7:
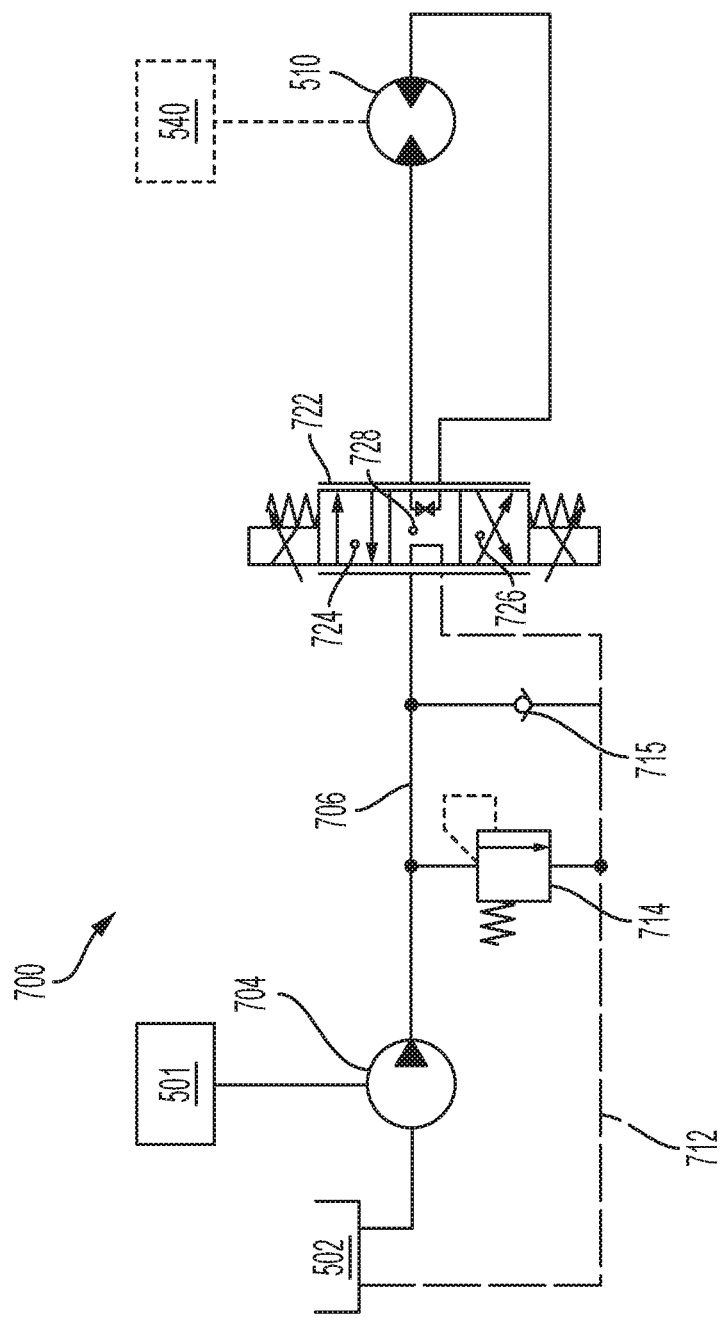
FIG. 7 is a hydraulic schematic of yet another system for reversing the direction of the auger of the header of FIG. 2.

FIG. 7 depicts a hydraulic schematic of another system 700 for reversing the rotational direction of the auger 131 of the header of FIG. 2. The system 700 is substantially similar to the system 500 and the primary differences therebetween will be described hereinafter.

Unlike the gear pump 504, the pump 704 of the system 700 is (or may be) a piston pump. A relief valve 714 is fluidly connected between the forward path fluid line 706 and the return path fluid line 712 for relieving excess pressure in the forward path fluid line 706. A check valve 715 is also fluidly connected between the lines 706 and 712 for relieving excess pressure in the return path fluid line 712. A three-position directional flow control valve 720 is connected to both fluid lines 706 and 712. The valve 722 differs from the valve 522 in that the valve 722 includes a third block corresponding to a neutral position (shown in FIG. 7) of the system 700.

More particularly, the valve 722 includes three blocks 724, 726 and 728. The controller 501 is operated to energize the valve 722 such that one (and only one) of the three blocks 724, 726 and 728 is registered with both lines 706 and 712 at any one time. When the first block 724 is registered with the lines 706 and 712, the first block 724 is configured for directing the fluid in the normal state. In the normal state, which corresponds to the harvesting mode of the combine, the valve 722 permits the passage of fluid from the pump 704 and toward the motor 510, and also permits the passage of fluid from the motor 510 back to the reservoir 502. When the second block 726 of the valve 722 is registered with the lines 706 and 712, the second block 726 is configured for directing the fluid in the reverse state. In the reverse state, the valve 722 directs the fluid from the pump 704 to the motor 510, and the valve 722 also directs the fluid from the motor 510 back to the reservoir 502. When the third block 728 is registered with the lines 706 and 712 (shown in FIG. 7), the third block 728 is configured for directing the fluid in the neutral state. In the neutral state, the valve 722 directs the flow of fluid from the pump 704 directly to the reservoir 502. In other words, in the neutral state, the fluid completely bypasses the motor 510. Operating the system in the neutral state permits an operator to deactivate the auger 131 for service or repair of the header. In the neutral state, the pump 704 can run without activating the motor 510.

Figure 8:
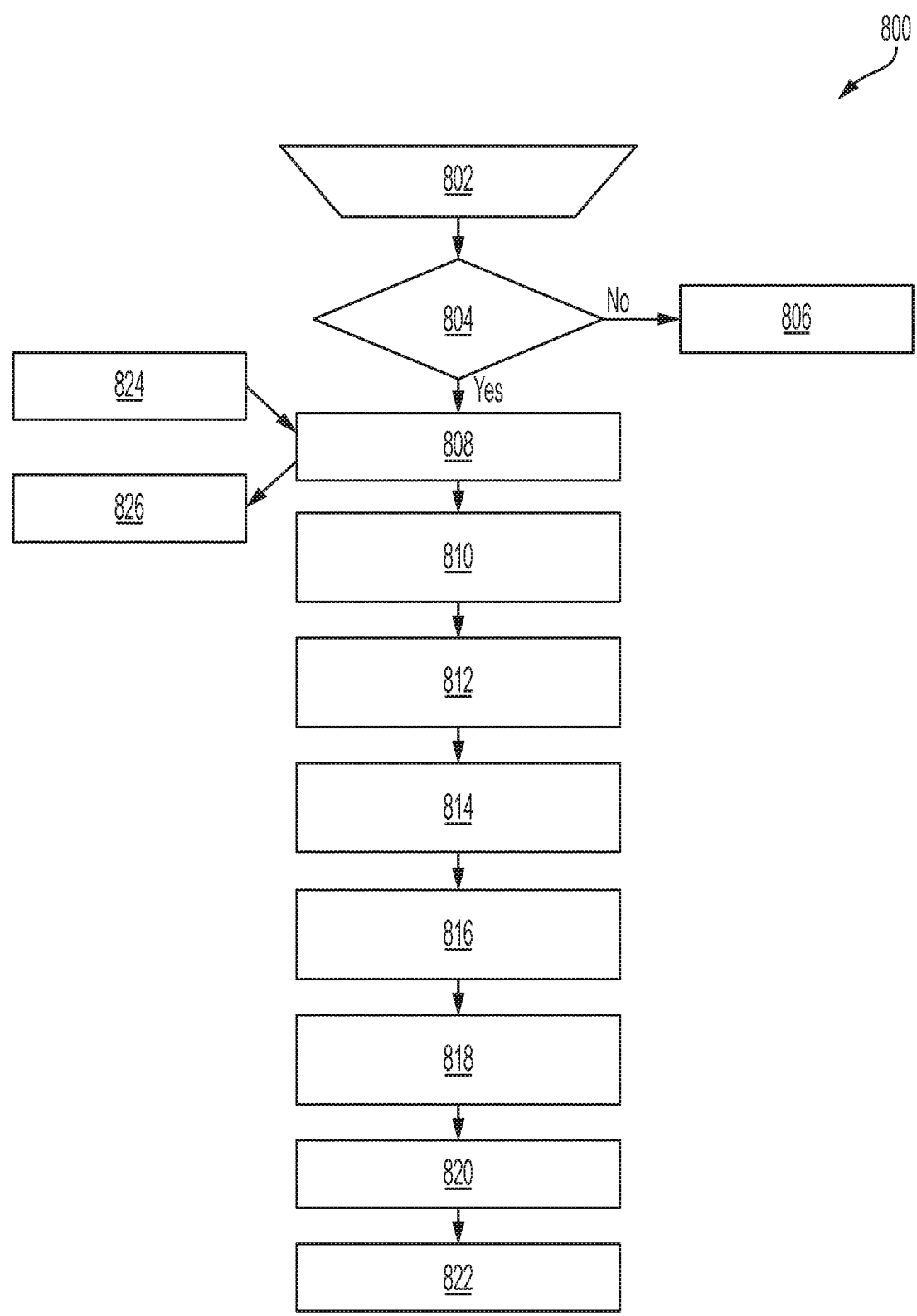
FIG. 8 is a block diagram illustrating an exemplary method for operating the systems of FIGS. 5-7.

FIG. 8 is a flow chart illustrating an exemplary method 800 for operating the systems 500, 600 and 700 for reversing the rotational direction of the auger 131. At input step 802, the operator of the combine instructs the combine to momentarily reverse the direction of the auger 131. This may be accomplished by either depressing a button, or entering a command into a graphical user interface (GUI) of the combine, for example. Alternatively, this step may be performed automatically by the controller 501 in a headland mode of the combine (described later). At decision step 804, the controller 501 (or processor associated with the controller 501) determines whether the combine is currently being operated in a harvesting mode. If the combine is not currently being operated in a harvesting mode, then the controller 501 transmits an audible or visual message on a display of the combine alerting the operator of the combine that the reverse feature is not available unless the combine is in a harvest mode, as indicated at step 806.

Alternatively, as indicated at step 808, if the combine is currently being operated in a harvesting mode, then the controller 501 first determines the speed of the motor 510 during the harvesting mode by recording the duty cycle of the proportional valve 520. The recorded duty cycle, which corresponds to the speed of the motor 510, will be used later in the method at step 820. Thereafter, the controller 501 decreases the flow of fluid to the motor 510 by adjusting the duty cycle of the proportional valve 520 to reduce the speed of the motor 510. The pump speed may be reduced until the motor 510 is either stopped or below a predetermined minimum threshold speed. Step 808 is performed to prevent possible damage to the motor 510 and the auger 131 that is connected thereto due to shock loads, which could occur if the augers 131 were reversed at full speed.

At step 810, the controller 501 switches the direction of fluid within the system 500/600/700 by energizing the directional flow control valve 522/722 to move the valve 522/722 against the bias of a spring to the reverse state (not shown in FIG. 5). In the reverse state of the valve 522/722, the valve 522/722 directs the fluid from the valve 520 (or pump 704) to the motor 510, and the valve 522/722 also directs the fluid from the motor 510 back to the reservoir 502. The reverse path of the fluid causes the motor 510 to rotate in a reverse direction, i.e., a direction that is opposite to the direction that the motor 510 normally rotates during the harvesting mode. At step 812, the controller 501 increases the flow of fluid to the motor 510 by adjusting the duty cycle of the proportional valve 520 (for systems 500 and 600). At step 814, the pump 504 is operated at the increased speed established at step 812 for a pre-determined amount of time. The pre-determined amount of time may correspond to one revolution, for example. A sensor connected to the controller 501 may monitor movement of the motor 510, the auger 131 or a component connected thereto. Reversing rotation of the auger 131 causes any unwanted wedged, wrapped, tangled, lodged or accumulated crop material to become dislodged from the auger 131. The system 500/600/700 is then ready to be returned to the harvesting mode.

At step 816, the controller 501 decreases the flow of fluid to the draper motor 510 by adjusting the duty cycle of the proportional valve 520, similar to step 808. At step 818, the controller 501 switches the direction of fluid within the system 500/600/700 by de-energizing the directional flow control valve 522/722 to return the valve 522/722 to the normal state that is shown in FIG. 5. In the normal state of the valve 522/722, the valve 522/722 freely permits the passage of fluid from the valve 520 (or pump 704) and toward the motor 510, and also permits the passage of fluid from the motor 510 back to the reservoir 502. At step 820, the controller 501 increases the flow of fluid to the motor 510 by returning the duty cycle of the proportional valve 520 back to its level recorded at step 808, which is sufficient for harvesting crop, such that harvesting can continue indefinitely at step 822 (for systems 500 and 600).

It is noted that steps 812, 814 and 816 are optional and may be omitted.

The method 800 may be completed during the headland mode, i.e., after the combine has completed harvesting one row in a crop field and is turning around to prepare to harvest the next row in the crop field. During this time, the header is lifted upwards in the air and is not operating in the harvest mode. The method 800 could be completed at every turn, every other turn, every tenth turn, or as needed. The method 800 may be repeated as many times as desired until the tangled, wedged, lodged or accumulated crop material becomes dislodged from the auger 131. The method 800 may also be completed as a precautionary measure.

The following steps 824, 808 and 826, which will be described hereinafter, relate to operating the system 700 in the neutral state, and it should be understood that these steps and are independent of the above-described steps 802-822 for reversing the system 700. At input step 824, the operator of the combine instructs the combine header to enter a neutral state. This may be accomplished by either depressing a button, or entering a command into a graphical user interface (GUI) of the combine, for example. At step 808, the controller 501 first determines the speed of the motor 510. Thereafter, the controller 501 decreases the flow of fluid (if any) to the motor 510 by adjusting the speed of the pump 704, for example. The pump speed may be reduced until the motor 510 is either stopped or below a predetermined minimum threshold speed. Step 808 is performed to prevent possible damage to the motor 510 and the auger 131 that is connected thereto due to any shock loads which could occur. At step 826, the controller 501 places the valve 722 in a neutral state by energizing the directional flow control valve 522/722. The controller 501 moves the valve 722 against the bias of a spring to the neutral state (shown in FIG. 7). In the neutral state of the valve 722, the valve 722 directs the fluid from the pump 704 directly to the reservoir 502, while bypassing the motor 510. Although step 808 was described in the course of operating the system 700 in the neutral state, it should be understood that step 808 may be skipped. The system 500/600/700 may include an emergency stop command that immediately stops all flow and returns the valves of the system 500/600/700 to their normal (harvest) state.

The system 500/600/700 and method 800 may vary from that which is shown and described. For example, a second motor can be connected in series with motor 510 (e.g., at a location between motor 510 and valve 522). The second motor could be connected to a conveyor belt of the header, for example, such that the auger 131 and the conveyor belt can be reversed at the same time to remove tangled, wedged, lodged or accumulated crop material from the conveyor belt(s) and auger of the header.

As another alternative to the system 500/600/700 and method 800 shown herein, an electric starter motor, solenoid or other motive device may be coupled to the motor 510 to cause momentary reverse rotation of the auger 131. As best shown in FIG. 5, an optional electric starter motor 540 may be connected to motor 510 to cause momentary reverse rotation of the auger 131. The optional electric starter motor 540 would be controlled by the controller 501. If the system 500 includes the optional electric starter motor 540, then the valve 522/722 (among other components of the system 500) may be omitted.

It is to be understood that the operational steps are performed by the controller 501 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 501 described herein is implemented in software code or instructions which are tangibly stored on a tangible computer readable medium. Upon loading and executing such software code or instructions by the controller 501, the controller 501 may perform any of the functionality of the controller 501 described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

In light of all the foregoing, it should thus be apparent to those skilled in the art that there has been shown and described a method and control system for reversing the direction of the auger of a header. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A system for reversing a rotational direction of an auger of a header of an agricultural machine, said system comprising:
    a first fluid line for delivering fluid to a motor that is configured to drive the auger;
    a directional flow control valve connected to the first fluid line and movable between (i) a first state in which the directional flow control valve is configured to deliver the fluid to the motor in a first fluid direction to cause the motor to move the auger in a first rotational direction, and (ii) a second state in which the directional flow control valve is configured to deliver the fluid to the motor in a second fluid direction that is different from the first fluid direction to cause the motor to move the auger in a second rotational direction that is opposite to the first rotational direction;
    a pump connected to the first fluid line for delivering fluid to the directional flow control valve;
    two flow control valves positioned in series in the first fluid line between the pump and the directional flow control valve, wherein a first flow control valve of the two flow control valves is positioned downstream of a second flow control valve of the two flow control valves, and wherein the two flow control valves are configured to be operated together to deliver a constant flow rate to the motor; and
    a second fluid line connected to (i) the first fluid line at a location between the two flow control valves and (ii) an input of the first flow control valve for communicating the fluid pressure in the first fluid line to the first flow control valve,
    wherein the directional flow control valve is maintained in the first state during a harvesting operation, and the directional flow control valve is maintained in the second state during an operation to dislodge crop material from the auger.

2. The system of claim 1, further comprising a controller that is configured to maintain the directional flow control valve in the second state for a pre-determined amount of time before returning the directional flow control valve to the first state.

3. The system of claim 1, wherein the two flow control valves are connected to the first fluid line in series with the directional flow control valve.

4. The system of claim 1, further comprising a controller configured to adjust one of the two flow control valves to reduce the flow rate of fluid delivered to the motor prior to switching the directional flow control valve to the second state.

5. The system of claim 1, further comprising a controller that is configured to energize the directional flow control valve and cause movement of the directional flow control valve to the second state.

6. The system of claim 5, wherein the controller is configured to energize the directional flow control valve and cause movement of the directional flow control valve to the second state for a pre-determined duration of time.

7. The system of claim 6, wherein the pre-determined duration of time corresponds to reverse movement of the auger along the second rotational direction by a pre-determined angular distance.

8. The system of claim 1, wherein the directional flow control valve is connected to the first fluid line at a location that is both upstream and downstream of the motor.

9. The system of claim 1, further comprising the auger.

10. A method of operating an auger of a header of an agricultural machine, said method comprising:
operating a pump to deliver fluid through a first fluid line to a motor in a first fluid direction such that the motor drives the auger in a first rotational direction during a harvesting operation, while a directional flow control valve connected to the first fluid line is maintained in a first state,
communicating the pressure within the first fluid line at a location between the pump and the directional flow control valve to a first flow control valve that is positioned downstream of a second fluid control valve on the first fluid line in order to deliver a constant flow rate to the motor, and
switching the directional flow control valve to a second state to deliver the fluid to the motor in a second fluid direction that is different from the first fluid direction thereby causing the motor to move the auger in a second rotational direction that is opposite to the first rotational direction for dislodging crop material wrapped about the auger.

11. The method of claim 10, further comprising reducing a fluid flow rate of the fluid through the first fluid line prior to the switching step.

12. The method of claim 10, further comprising increasing a fluid flow rate of the fluid through the first fluid line following the switching step.

13. The method of claim 10, further comprising switching the directional flow control valve to a third state to bypass the motor.

14. The system of claim 1, further comprising a third fluid line connected to (i) the first fluid line at a location downstream of the first flow control valve, and (ii) the pump for communicating the pressure in the first fluid line to a swash plate within the pump.

15. The method of claim 10 further comprising communicating the pressure at a location downstream of the first flow control valve in the first fluid line to a swash plate within the pump.

16. A header of an agricultural machine, said header comprising:
a header frame;
an auger that is rotatably mounted to the header frame for delivering crop material to a feederhouse of the agricultural machine;
a first fluid line for delivering fluid to a motor that is configured to drive the auger;
a directional flow control valve connected to the first fluid line and movable between (i) a first state in which the directional flow control valve is configured to deliver the fluid to the motor in a first fluid direction to cause the motor to move the auger in a first rotational direction, and (ii) a second state in which the directional flow control valve is configured to deliver the fluid to the motor in a second fluid direction that is different from the first fluid direction to cause the motor to move the auger in a second rotational direction that is opposite to the first rotational direction;
a pump connected to the first fluid line for delivering fluid to the directional flow control valve; and
two flow control valves positioned in series in the first fluid line between the pump and the directional flow control valve, wherein a first flow control valve of the two flow control valves is positioned downstream of a second flow control valve of the two flow control valves, and wherein the two flow control valves are configured to be operated together to deliver a constant flow rate to the motor;
wherein the directional flow control valve is maintained in the first state during a harvesting operation, and the directional flow control valve is maintained in the second state during an operation to dislodge crop material from the auger.

* * * * *